United States Patent Office 2,964,138
Patented Dec. 13, 1960

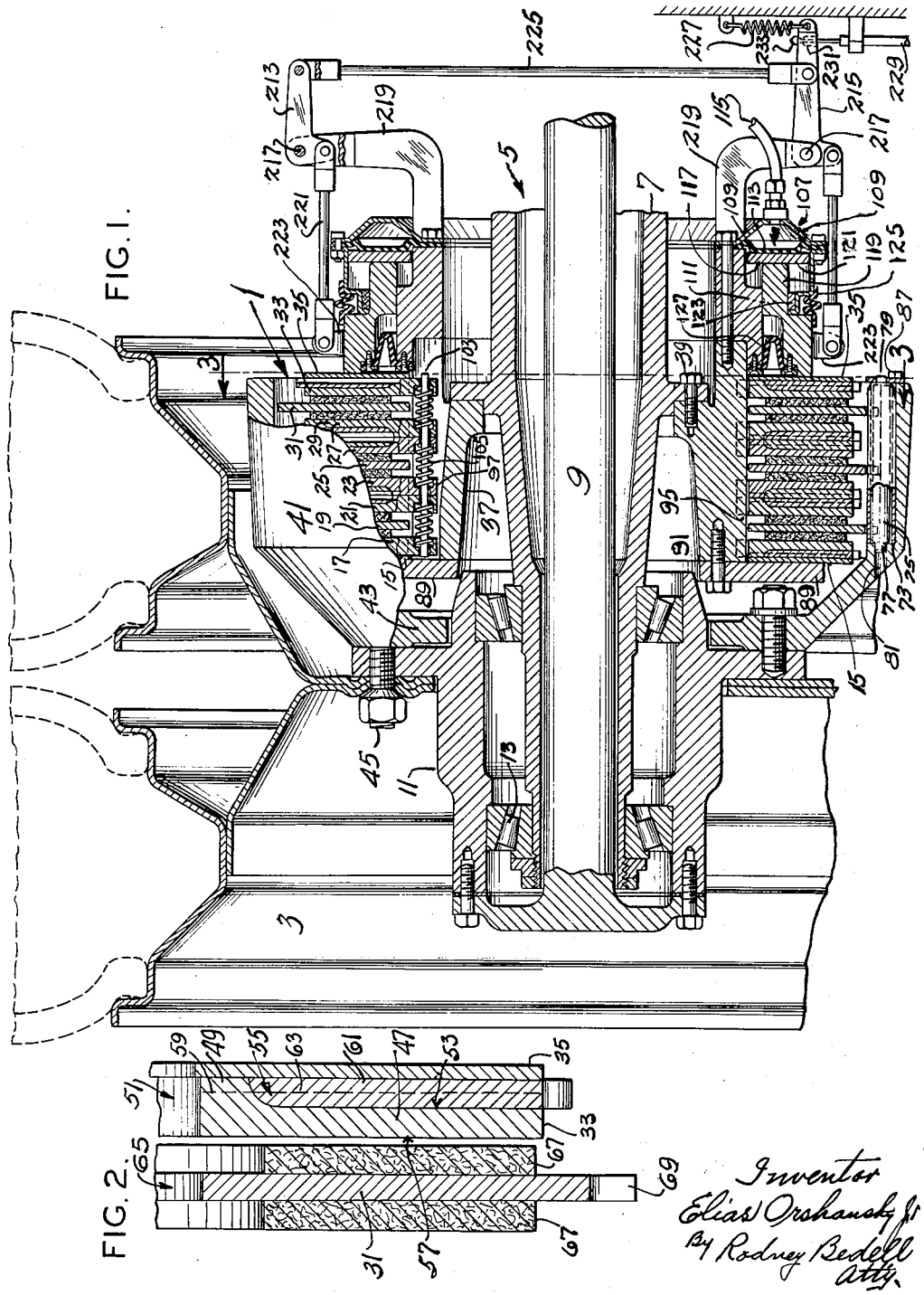

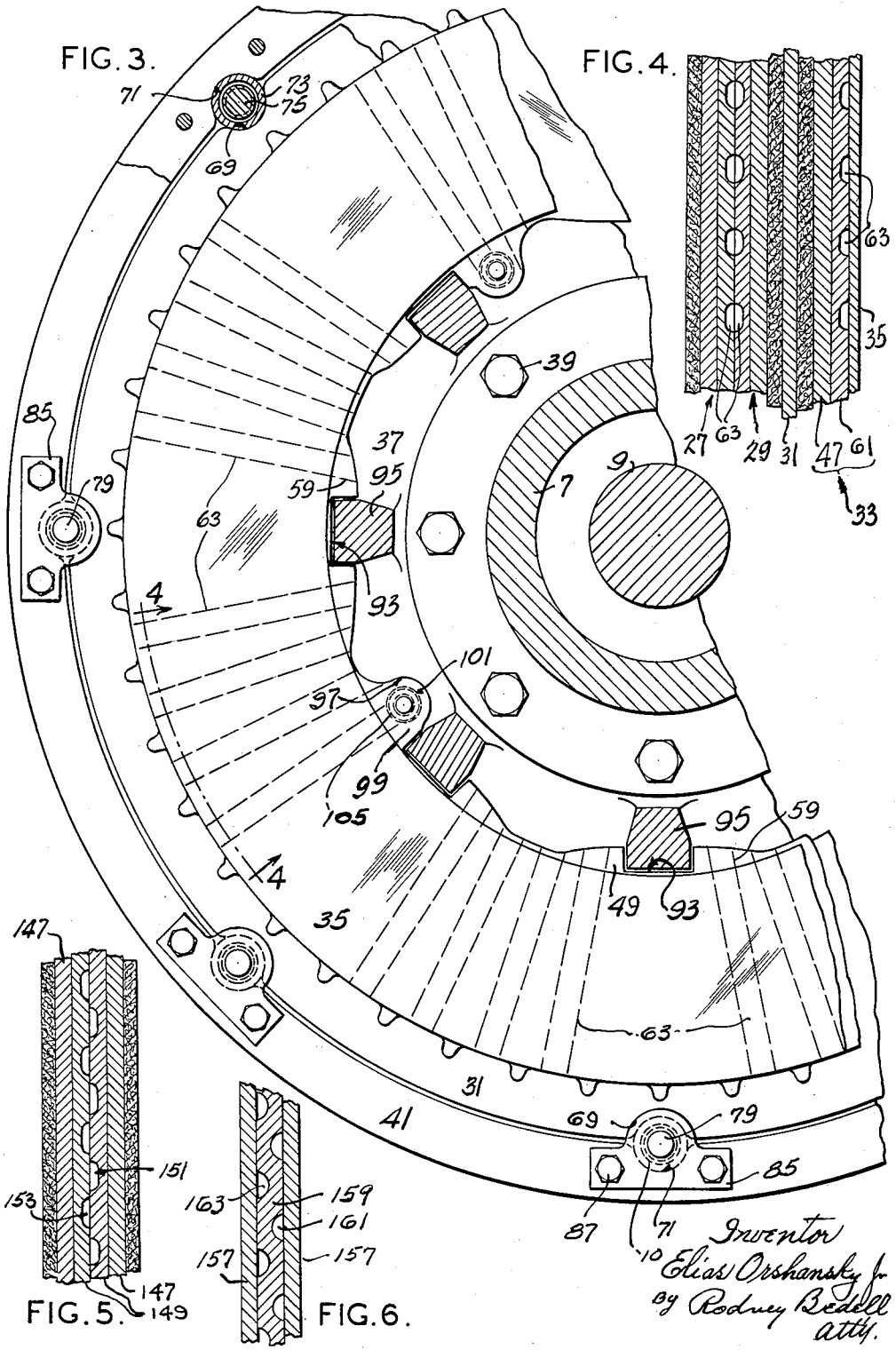

2,964,138
DISK BRAKE

Elias Orshansky, Jr., Newport Beach, Calif., assignor to Chicago Railway Equipment Company, Chicago, Ill., a corporation of Illinois Filed Apr. 24, 1957, Ser. No. 654,865

5 Claims. (Cl. 188—72)

This invention relates to brakes, clutches, and the like, which include a plurality of interleaved disks, and more particularly to such a device actuated by a fluid pressure motor. Accordingly, when reference is made herein to a disk brake structure or the like, a disk clutch structure is also contemplated.

Among the several objects of the invention are: the application of thrust to a plurality of juxtaposed annular disks substantially uniformly throughout their area and, preferably, by a single fluid pressure motor device which also is annular and, like the disks, may surround a central axle or shaft; the mechanical operation of the actuated parts, in the event of failure of fluid pressure supply, by the same manual control; the slidable assembly of a plurality of friction disks such as iron or steel in a housing of softer metal, such as aluminum, without undue wear on the latter; facilitating the replacement of disks in such an assembly; and the effective dissipation of heat produced by friction between coacting disks by passing air, or other fluid, through radial passages in the disks.

The invention accordingly comprises the constructions hereinafter described, the scope of the invention being indicated in the appended claims.

In the accompanying drawings illustrating the invention:

Figure 1 is a longitudinal cross section of a fluid pressure operated disk brake for a wheel of a vehicle embodying this invention;

Figure 2 is a detail section corresponding to a part of the structure shown in the lower portion of Figure 1, but drawn to a larger scale.

Figure 3 is a transverse section on line 3—3 of Figure 1 and drawn to a larger scale.

Figure 4 is a detail section on line 4—4 of Figure 3.

Figure 5 is a section corresponding to Figure 4 but illustrating another form of brake disk structure.

Figure 6 is a detail section similar to Figures 4 and 5, but illustrating a third form of brake disk structure.

The invention may be embodied in a brake for a wheel on a dead axle of a vehicle, or in a brake other than a vehicle brake, and also various features of the invention may be useful in a clutch structure not associated with a vehicle axle.

The invention shown in Figures 1–4 is embodied in a fluid pressure operated disk brake 1 for a wheel 3 of a vehicle, and more particularly for a wheel on a live axle assembly 5 of a highway motor truck or trailer. As illustrated, the live axle assembly comprises a tubular housing member 7 through which extends a drive shaft 9. Tubular housing member 7 is nonrotatable, being fixed to the frame of the vehicle. Wheel 3 has a hub 11 secured to the outer end of shaft 9. Roller bearings for the hub are indicated at 13.

The brake comprises a series of disks 15, 17, 19, 21, 23, 25, 27, 29, 31, 33 and 35. These disks surround a spider or carrier 37 which is fixed as indicated at 39 to the tubular housing 7. Disks 15 and 35, the end disks of the series, may be steel plates, and may be made simply as sheet steel stampings or ferrous metal castings or other suitable friction material. Disks 17, 21, 23, 27, 29 and 33 are nonrotatable disks of a special construction of this invention. These nonrotatable disks are splined on spider 37. Disks 19, 25 and 31 are rotatable with brake housing 41.

The disks are surrounded by a generally cylindrical brake housing 41 having a flange 43 fixed as indicated at 45 to wheel hub 11. The brake housing is preferably cast of aluminum, plastic copper, or other suitable metal of relatively light weight and high heat conductivity.

The nonrotatable disks 17, 21, 23, 27, 29, and 33 are of identical construction. Each comprises a circular plate 47 (Figure 2), having a hub portion 49 provided with a central opening 51. The hub portion 49 projects axially from one face 53 of the plate 47 and thus forms an annular recess 55 in this face of the plate which extends radially from the hub portion to the outer periphery of the plate. The other face 57 of the plate is flat. Hub portion 49 has radial grooves 59 (Figure 3) adjacent face 53 of the plate extending from the central opening 51 to the recess 55. Next to recessed portion 55 is a cast ring 61 of aluminum or other suitable relatively lightweight metal of relatively high heat conductivity. The outside face of ring 61 is flush with the end of hub portion 49 and the ring is formed with radial grooves 63 in its outside face aligned with grooves 59.

Rotatable disks 19, 25, 31 are identical. Each comprises a flat circular ferrous metal plate, which may be a sheet steel stamping, having a central opening 65. A flat ring of suitable fibrous friction material 67 is applied to each face of the disk. Each disk 19, 25, 31 has a plurality of arcuate transverse recesses 69 in its outer periphery. Cylindrical brake housing 41 has a plurality of longitudinal internal arcuate grooves 71 corresponding to recesses 69. Disks 19, 25, 31 are keyed to brake housing 41, but free to slide axially with respect to the housing, by hardened steel tubular feather keys 73 which extend lengthwise through matching recesses 69 and grooves 71. Extending through each tubular key 73 is a pin 75 which has reduced-diameter end portions 77 and 79 piloted respectively into a hole 81 in the brake housing and a hole 83 in a locking plate 85 secured to the inner end of the brake housing by screws 87. There is sufficient clearance between each pin 75 and the surrounding tubular key 73 (see Figure 3) to insure that no load is transmitted through pin 75, thereby preventing transmission of torque to locking plates 85. Pins 75 prevent keys 73 from dropping out of the brake housing during assembly. Hardened steel keys 73 are resistant to wear caused by sliding of disks 19, 25, 31. If grooves 71 are machined in brake housing 41, holes 81 are also useful as pilots for end milling to clean up the grooves.

The outer face of end disk 15 contacts a thrust plate or abutment 89 secured at 91 to the outer end of spider 37. Disk 17 is arranged with its aluminum ring 61 toward end disk 15. Grooves 59, 63 of disk 17 provide radial passages for flow of air for cooling. Next come disks 19, 21, 23. Disks 21, 23 are arranged back-to-back; that is, with their aluminum rings 61 toward one another, and have their recesses 59, 63 in register, thereby providing radial passages for flow of air for cooling. This paired arrangement of disks 21 and 23 is advantageous since it constitutes a brake disk unit with interior radial air passages from the central opening in the disk to the periphery of the disk and is formed more readily than by using a one-piece disk with radial holes bored in it to provide air passages. Next to paired disks 21 and 23 comes disk 25, then disks 27 and 29 which are paired in the same manner as disks 21 and 23. Next comes disk 31, then disks 33 and 35. Disk 33 is arranged with its aluminum ring facing end disk 35.

Each of nonrotatable disks 17, 21, 23, 27, 29 and 33 has a plurality of internal recesses 93 receiving splines 95 integrally formed on spider 37. This locks disks 17, 21, 23, 27, 29 and 33 against rotation (noting that the spider is nonrotatable since it is fixed to the axle housing 7), while permitting axial sliding of the disks on the spider.

Spider 37, between certain of splines 95, is formed with axially extending peripheral recesses 97, and disks 17, 21, 23, 27, 29 and 33 have ears 99 extending into these recesses. Each of ears 99 has a hole 101. Pins 103 extend through holes 101. Coil compression springs 105 surround pins 103 between disk 17 and the pair of disks 21 and 23, between the pair of disks 21 and 23 and the pair of disks 27 and 29, and between the pair of disks 27 and 29 and the disk 33. The thrust of these springs tends to separate the disks.

An expansible chamber type fluid pressure motor generally designated 107 is provided for forcing the disks together against abutment 89 (and against the disk-separating bias of the springs 105) to frictionally engage the disks. This fluid pressure motor comprises an annular-fluid chamber 108 which has a cover 109 bolted to the supporting structure 111 and a flexible diaphragm 113. The application of fluid from a pump or reservoir (not shown) through a line 115 forces the diaphragm in the direction of the arrow and transmits force to plate 117, which in turn transmits force to an annular member 119. An annular guard 121 surrounds the mechanism and excluudes dirt, and a felt packing 123 makes the exclusion more effective. Rubber boots 125, 127 are for the same general purpose.

Means for mechanically applying the brake in the event of failure of the fluid system comprises a pair of bell cranks 213 and 215 pivoted at 217 on brackets 219 on the inner (rearward) end of fixed motor member 109. The bell cranks have short arms connected by links 221 to ears 223 on movable motor member 111, and long arms connected together by a link 225. This link is offset laterally to clear axle housing 7. A spring 227 between the long arm of bell crank 215 and the axle housing or frame of the vehicle biases the bell cranks to rock in the direction for retracting the member 111. A cable 229 extends loosely through a hole 231 in the long arm of bell crank 215 and has a knob 233 on its end for engaging the crank 215 and rocking it in the direction for moving member 111 forward on pulling the cable. It will be understood that the cable will be disposed for operation by the driver of the vehicle, either directly or by means of a force-multiplying linkage. The connection between the cable and bell crank 215, as will be apparent, is a lost motion connection which permits the hydraulic operation of the brake without moving the cable.

Summarizing the operation, when fluid under pressure is supplied through line 115 to the motor 107, movable member 111 of the motor is driven forward (to the left, Figure 1) to take up the clearance between the brake disks to provide braking friction. Rotatable disks 19, 25 and 31 slide on hardened steel feather keys 73 and nonrotatable disks 17, 21, 23, 27, 29, 33 slide on splines 95. Upon admission of fluid to the annular chamber, the brake disks are subjected to even thrust throughout their area and an effective braking results. Temperature increases are uniform, thus avoiding spotty concentration of heat and consequent deterioration of brake linings. The heat generated by the friction is rapidly dissipated by the relatively high heat conductivity of the aluminum rings 61 of the nonrotatable disks and the aluminum brake housing 41, and in view of the provision of the radial air flow passages in the series of disks. When fluid pressure in motor 107 is relieved, springs 105 release the brake disks from frictional engagement. Motor 107 applies pressure to the series of disks uniformly over an annular area coaxial with the disks, and this avoids canting and uneven wear of the disks. In the event of failure of the means for fluid pressure operation of the brake, it may be manually operated by a pull on cable 129.

The objects of the invention recited in the introductory portion of the specification are achieved by the structure described.

Another form of the stationary brake disk unit is illustrated in Figure 5 in which the ferrous metal recessed plate 147 corresponds to the plate 47 previously described, but the aluminum castings 149 next to the plates 147 of the same disk unit have their respective radial grooves 151 and 153 disaligned whereby the radial passageway is of smaller cross sectional area than in the first form of the invention, but there are twice as many passages and the total surface exposed to the air stream is substantially the same.

Figure 6 illustrates another arrangement in which the associated ferrous metal plates 157 of each disk unit are applied to opposite sides of a single intermediate aluminum plate 159 having radial grooves 161 and 163 in its opposite sides respectively and extending alongside the opposing faces of the ferrous metal plates.

If the ferrous metal and aluminum plates of any of the composite disks are bonded together the coefficient of heat transfer between the plates will be increased, and this will be the preferred construction although not essential to the effective operation of the disks.

Other changes could be made in the constructions described without departing from the scope of the invention, and it is intended that all matter contained in he above description or shown in the accompanying drawings shall be interpreted as illustrative and not in a limiting sense.

What is claimed is:

1. In combination, a plurality of friction disks, an axial support for the disks, and an expansible chamber type fluid pressure motor for applying pressure to the disks comprising an inner annular member surrounding the support and a radially outer annular member surrounding the inner annular member, and being relatively slidable axially thereover, the inner annular member being fixed to the support against axial movement and the outer annular member being axially movable over the inner annular member, the inner annular member having an external annular shoulder facing in one axial direction, the outer annular member having an internal annular shoulder facing in the opposite direction from and opposed to said external annular shoulder, one of said annular members having a chamber at the outer end of said inner annular member, a passage for admitting fluid under pressure to said chamber to actuate said outer member, and said annular members being in slidable sealing engagement on opposite sides of the shoulders.

2. In combination, a plurality of friction disks, an axial support for the disks, and an expansible chamber type fluid pressure motor for applying pressure to the disks comprising an inner annular member surrounding the support and an outer annular member surrounding the inner annular member, one of said annular members being fixed to the support against axial movement and the other being axially movable, the inner annular member having portions of different external diameter thereby providing an external annular shoulder facing in one axial direction, the outer annular member having portions of different internal diameter corresponding to said portions of the inner annular member thereby providing an internal annular shoulder, the portion of the outer member of smaller internal diameter fitting on the portion of the inner member of smaller internal diameter, the portion of the outer member of larger external diameter fitting on the portion of the inner member of larger external diameter, with said shoulders facing one another, one of said annular members having a passage for admitting fluid under pressure between said shoulders, and said annular member being in relatively slidable sealing engagement on opposite sides of the shoulders to form a sealed chamber for fluid between said shoulders.

3. A combination according to claim 2 further comprising a manually operable mechanical linkage between the inner and outer annular members for manually moving the outer annular member to apply thrust to the disks independently of fluid in the fluid pressure chamber.

4. A disk brake for a wheel of a vehicle having a non-rotatable axle member carrying the wheel and the wheel having a hub rotatable on the axle member, a spider arranged for fixed mounting on the axle member inward of the wheel hub, a series of disks surrounding the spider, a brake housing surrounding the series of disks and having a flange arranged for fixed mounting on the wheel hub, some of the disks being splined on the spider and thereby held against rotation while being axially movable, others of the disks being keyed to the brake housing for rotation therewith while being axially movable, an abutment for the series of disks at the outer end of the spider, and an expansible chamber type motor at the inner end of the spider for forcing the disks together against the abutment, said motor comprising an inner annular member projecting axially from said spider and fixed thereto, an outer annular member surrounding the inner annular member and axially movable thereon, said outer annular member being directly engageable throughout an annular face with the series of disks, said inner and outer annular members being substantially continuous lengthwise of the axle member forming a sealed expansible chamber therebetween, the inner annular member having a passage for supplying fluid under pressure to said chamber, said outer annular member having an end thrust face engaged with the series of disks, the inner annular member having an external annular shoulder facing axially in one direction, the outer annular member having an internal annular shoulder facing axially in the opposite direction and opposed to said external annular shoulder, and the inner annular member having a passage for admitting fluid under pressure between said shoulders, said outer member end thrust face having an inner diameter greater than the outer diameter of said shoulders.

5. A disk brake as set forth in claim 4 wherein the brake housing is made of metal of light weight and of a high degree of thermal conductivity and the rotatable disks are keyed to the brake housing by means of keys of substantially heavier metal of a substantially lower degree of thermal conductivity.

References Cited in the file of this patent

UNITED STATES PATENTS

| | | |
|---|---|---|
| 1,933,176 | Jonsson | Oct. 31, 1933 |
| 2,020,667 | Wahl | Nov. 12, 1935 |
| 2,277,106 | Hewitt | Mar. 24, 1942 |
| 2,440,020 | Pratt | Apr. 20, 1948 |
| 2,453,237 | Le Tourneau | Nov. 9, 1948 |
| 2,477,500 | Tack | July 26, 1949 |
| 2,522,809 | Austin | Sept. 19, 1950 |
| 2,525,648 | Butler | Oct. 10, 1950 |
| 2,542,545 | Lyman | Feb. 20, 1951 |
| 2,559,885 | Loweke | July 10, 1951 |
| 2,667,947 | Lucien | Feb. 2, 1954 |
| 2,758,677 | Klaue | Aug. 14, 1956 |
| 2,771,966 | Davey | Nov. 27, 1956 |
| 2,823,770 | Helvern | Feb. 18, 1958 |

FOREIGN PATENTS

| | | |
|---|---|---|
| 893,970 | France | Mar. 6, 1944 |